United States Patent
Hartman et al.

(10) Patent No.: US 6,944,249 B2
(45) Date of Patent: Sep. 13, 2005

(54) METHOD AND SYSTEM FOR TRANSMITTING ISOCHRONOUS VOICE IN A WIRELESS NETWORK

(75) Inventors: David Hartman, Irvine, CA (US); Mark Dale, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 835 days.

(21) Appl. No.: 09/850,652

(22) Filed: May 7, 2001

(65) Prior Publication Data

US 2002/0101946 A1 Aug. 1, 2002

Related U.S. Application Data (60) Provisional application No. 60/225,915, filed on Aug. 17, 2000.

(51) Int. Cl.[7] .................................................. H03D 3/24
(52) U.S. Cl. ...................... 375/373; 375/356; 375/371; 370/335; 370/436; 418/36; 725/129
(58) Field of Search ................................. 375/373, 356, 375/371; 370/335, 436; 725/129; 418/36

(56) References Cited

U.S. PATENT DOCUMENTS

| | | | | | |
|---|---|---|---|---|---|
| 4,012,598 | A | * | 3/1977 | Wiley | ........................ 375/371 |
| 5,138,635 | A | * | 8/1992 | Ballance | ...................... 375/356 |
| 5,696,765 | A | * | 12/1997 | Safadi | ......................... 370/436 |
| 5,710,765 | A | * | 1/1998 | Lee et al. | ...................... 418/36 |
| 6,243,369 | B1 | * | 6/2001 | Grimwood et al. | ......... 370/335 |
| 2002/0129379 | A1 | * | 9/2002 | Levinson et al. | ........... 725/129 |

FOREIGN PATENT DOCUMENTS

| | | | |
|---|---|---|---|
| FR | 2785751 A | 5/2000 | |
| GB | 0768769 A2 | * 4/1997 | ............. H04J/3/06 |
| WO | WO 0028712 A | 5/2000 | |

* cited by examiner

*Primary Examiner*—Stephen Chin
*Assistant Examiner*—Sudhanshu C. Pathak
(74) *Attorney, Agent, or Firm*—Christie, Parker & Hale, LLP.

(57) ABSTRACT

In one aspect the present invention describes an electronic circuit for transmitting voice packet data over a wireless network with an upstream transmission mode and a downstream transmission mode. The circuit comprises a first phase-lock loop (PLL) for locking a first clock to a time stamp signal, wherein the first clock synchronizes upstream data transmission over the wireless network; and a second PLL for locking a second clock to the time stamp signal, wherein the second clock is used for sampling voice data for downstream voice data transmission over the wireless network.

35 Claims, 3 Drawing Sheets

METHOD AND SYSTEM FOR TRANSMITTING ISOCHRONOUS VOICE IN A WIRELESS NETWORK

CROSS-REFERENCE TO RELATED APPLICATIONS

This patent application claims the benefit of the filing date of U.S. Provisional Patent Application Ser. No. 60/225,915, filed Aug. 17, 2000 and entitled "METHOD FOR TRANSMITTING ISOCHRONOUS VOICE IN A WIRELESS NETWORK," the entire contents of which are hereby expressly incorporated by reference.

FIELD OF INVENTION

The present invention relates to data transmission over wireless networks. More specifically, the invention is directed to system and method for transmitting isochronous voice in a wireless network.

BACKGROUND OF THE INVENTION

The Data Over Cable Service Interface Specification (DOCSIS) is a standard developed for cable data communications. The DOCSIS standard has been enhanced to support telephony and other real time services. Wireless networks are becoming more widely used as a general-purpose connectivity alternative for a broad range of data communication applications. Recently, some wireless network specifications have adopted the DOCSIS Media Access Control (MAC) layer.

The DOCSIS MAC utilizes a time division multiple access (TDMA) technique to facilitate communications between cable modems and the Cable Modem Termination System (CMTS), or headend, in the "upstream" path. DOCSIS TDMA access is accomplished by assigning upstream time slots within which cable modems transmit their messages to the headend. Each timeslot granted to a modem is an integer number of minislots, which are the basic medium access control (MAC) timing unit for allocation and granting TDMA slots. In DOCSIS, minislot timing is derived from the MAC global time reference clock, such that each minislot begins and ends upon a rising edge of the clock.

The DOCSIS MAC transmits a 32 bit timestamp message derived from the 10.24 MHz global time reference at the CMTS in the dowstream to all subscribers for the purpose of upstream transmission synchronization. Subscriber modems use this timestamp message to produce a local version of the global time reference that is synchronized to the CMTS clock. The technique for producing the local clock is called a Timestamp Recovery Circuit (TRC). Divisions of the derived 10.24 MHz clock represent both symbol times and minislot boundaries on the upstream channel. Therefore, all upstream timing is related to the 10.24 MHz clock. Additionally, each upstream minislot is a power-of-two number of the 10.24 MHz reference intervals in duration. Moreover, all of the allowed upstream symbol rates are power-of-two sub-multiples of the 10.24 MHz rate. Thus, an integer number of transmitted symbols fit into a minislot for all allowed symbol rates.

An additional benefit to using the 10.24 MHz clock is that it is compatible with telephony sample and frame rates. Assuming that the smallest reasonable upstream frame interval for isochronous telephony is 5 ms, there will always be an integer number of minislot in a frame. Also, since 10.24 MHz is an integer multiple of 8 KHz, the global reference clock can be used to derive a telephony sampling clock with the use of simple binary counters. Thus, the frame interval and sampling clock can lock to the upstream transmit opportunities insuring that sample buffers will not overflow or underflow.

In the Broadband Wireless Internet Forum (BWIF) Orthogonal Frequency Division Multiplexing (OFDM) implementation the power-of-two timestamp to minislot relationship does not hold. Each minislot is made up of a single OFDM symbol and its cyclic prefix. The burst times for these OFDM minislots, for various system sample rates, are shown in Table 1. Note that there is no convienent power of 2 relationship to a 10.24 MHz time base.

In this environment, the 10.24 MHz clock is replaced with a global timing reference related to the OFDM minislot. For a 24 MHz sample rate system a 5.33 MHz global time clock is used (i.e., Fs/4.5 where, the sampling frequency, Fs is 24 MHz). This clock has the desired effect of preserving the power-of-two relationship between the minislot time and the global reference clock.

In an isochronous voice transmission environment, it is desirable to grant a modem a transmission opportunity for a given integer number of voice samples. Since the voice sample rate is 8 KHz, a common interval for framing is 10 ms. Other intervals related to 10 ms are sometimes used, including 5 ms and 30 ms for some voice CODEC's. However, with the 5.33 MHz clock, an integer number of minilslots no longer fit into a 10 ms interval. The frame size ends up being slightly shorter or slightly longer than 10 ms. Also, the telephony sample clock can no longer be generated from the global reference clock with a straightforward binary counter.

Therefore, there is a need for a system and method to transmit isochronous voice over wireless networks that can utilize the existing BWIF OFDM infrastructure without substantial and costly changes.

SUMMARY OF THE INVENTION

In one embodiment, the present invention generates frames for packet voice transmission over a wireless network on average every 10 ms. That is, some of the frames are slightly shorter than 10 ms, and some frames are slightly longer than 10 ms. This technique preferably requires no change to the current DOCSIS Global Time stamp messaging, other than a change in the clock frequency used to produce the timestamp messages transmitted from the Wireless Access Termination System (WATS), or headed, to Wireless Modems (WM).

In one embodiment of the present invention, the system continues to use the Fs/4.5 global reference clock and lets the upstream frame size, under control of the WATS scheduler, vary from burst to burst in order to arrive at an average frame time of 10 ms.

In one aspect the present invention describes an electronic circuit for transmitting voice packet data over a wireless network with an upstream transmission mode and a downstream transmission mode. The circuit comprises a first phase-lock loop (PLL) for locking a first clock to a time stamp signal, wherein the first clock synchronizes upstream data transmission over the wireless network; and a second PLL for locking a second clock to the time stamp signal, wherein the second clock is used for sampling voice data for downstream voice data transmission over the wireless network. In one embodiment, the first PLL comprises a low pass filter; a numerically controlled oscillator (NCO) coupled to the output of the low pass filer; a counter loaded with a time stamp message and driven by the NCO for generating an estimated time stamp signal; and a phase detector for detecting phases of the time stamp signal and the estimated time stamp signal and taking a difference of the phases for generating an error value.

In one embodiment, the second PLL comprises a second low pass filter; a second numerically controlled oscillator (NCO) coupled to the output of the low pass filer, wherein the low pass filter slows the clock variation at the input of the NCO; a first divider/multiplier for dividing a time stamp message by N; a second divider/multiplier for multiplying the output of the NCO by M; a second counter loaded with the time stamp message divided by N and driven by the second divider/multiplier for generating an estimated adjusted time stamp signal; and a second phase detector for detecting phases of the time stamp divided by N signal and the estimated adjusted time stamp signal for generating an error value.

In another aspect the present invention discloses a method for transmitting isochronous voice data over a fixed wireless network with an upstream transmission mode and a downstream transmission mode. The method comprising the steps of scheduling a number of frames with a predetermined average data frame duration; receiving a time stamp signal; locking a first clock to the received time stamp signal, wherein the first clock is used for synchronizing upstream data transmission over the wireless network; and locking a second clock to the received time stamp signal, wherein the second clock is used for sampling voice data.

BRIEF DESCRIPTION OF THE DRAWINGS

The objects, advantages and features of this invention will become more apparent from a consideration of the following detailed description and the drawings in which.

Table 1 shows burst characteristics for a 10 ms frame.

Table 2 shows an exemplary frame format.

Table 3 shows exemplary NCO denominators.

Table 4 shows exemplary divide ratios; and

Table 5 shows exemplary calculated values for σjit.

DETAILED DESCRIPTION

In a cable modem system, a headend or cable modem termination system (CMTS) is typically located at a cable company facility and functions as a modem which services a large number of subscribers. In the case of a wireless network, the headend is a wireless access termination system (WATS). Each subscriber has a Wireless Modem (WM), analogous to the Cable Modem (CM) in a cable plant. Thus, the WATS must be capable of facilitating bidirectional communication with any desired one of the plurality of wireless modems.

As used herein, the WATS is defined to include that portion of a headend which facilitates communication with a plurality of cable modems. A typical WATS includes a burst receiver, a continuous transmitter and a medium access control (MAC). The WATS is capable of transmitting data to the cable modems (downstream transmission) and receiving data from the cable modems (upstream transmission), via a wireless connection.

The asymmetric data throughput defined by the upstream channel requires a much lower data rate than the downstream channel. This results from the inherently larger amount of data which is communicated via the downstream channel during Internet access.

Contemporary cable modem systems operate on a plurality of upstream channels and utilize time division multiple access (TDMA) in order to facilitate communication between a plurality of cable modems and a single cable modem termination system on each upstream channel. Typically, between 250 and 500 cable modems communicate with a single CMTS. BWIF Wireless Networks are expected to operate in a similar fashion.

In order to accomplish TDMA for upstream communication, it is necessary to assign time slots within which wireless modems having a message to send to the WATS are allowed to transmit. The assignment of such time slots is accomplished by providing a request contention area in the upstream data path within which the wireless modems are permitted to contend in order to place a message which requests additional time in the upstream data path for the transmission of their message. The WATS responds to these requests by assigning time slots to the wireless modems making such a request, so that as many of the wireless modems as possible may transmit their messages to the WATS utilizing TDMA so that the transmissions are performed without undesirable collisions.

Because of the use of TDMA, the WATS needs to use a burst receiver, rather than a continuous receiver, to receive data packets from wireless modems via upstream communications. However, the burst communications inherent to TDMA systems require periodic and frequent reacquisition of the signal. That is, during TDMA communications, the signal needs to be reacquired for each separate burst transmission being received.

The baseline design for the wireless OFDM system may use a "tick clock" different from the DOCSIS conventions. In place of a 10.24 MHz tick clock, a $F_s/4.5$ MHz tick clock may be employed in some configurations where, $F_s$ is the OFDM sample rate. In the DOCSIS design, the minislot time duration should be a power-of-two number of tick clock periods. For the wireless OFDM application, the OFDM burst time should also be equal to a minilslot time. Use of the $F_s/4.5$ tick clock allows both of these constraints to be satisfied simultaneously. For example, in the $F_s$=24 MHz case, OFDM burst times are either 48 or 96 usec. In this case, the tick clock period is 24/4.5=5.3333 MHz and there are 256 and 512 tick clocks respectively in each possible minilslot duration. For the other sample rate cases, the minilslot duration scales inversely with the sample rate so that the number of tick clocks per minislot is the same power of 2 values (e.g., 256 and 512).

In an isochronous voice transmission environment, ideally, it is desirable for a grant to come every 10 ms. However, because a frame size of exactly every 10 ms can not be obtained with the new 5.33 MHz timing, the present invention generates the frames, on average, every 10 ms. That is, some of the frames are slightly less than 10 ms long, and some frames are slightly more than 10 ms long.

The present invention is directed to a system and method for transmitting isochronous voice in a wireless network, and in one embodiment of the present invention, a technique that requires no change to the current DOCSIS global time stamp messaging, other than a change in the clock frequency used to derive the timestamp message transmitted from the WATS to wireless modems. In this embodiment, preferably, the only hardware change is to the smooth clock NCO in the subscriber TRC circuit.

In one embodiment of the present invention, the system continues to use the Fs/4.5 global reference clock and lets the frame size, under control of the headend scheduler, vary from burst to burst in order to arrive at an average frame time of exactly 5,10,20, or 30 ms, depending on requirements of different systems. In order to make the frame time an exact multiple of, for example, 10 ms, there should be an integer plus rational fraction number of minislots in a 10 ms frame. Table 1 shows that such a rational fraction exists for all of the BWIF burst profiles specified.

Figure 1:
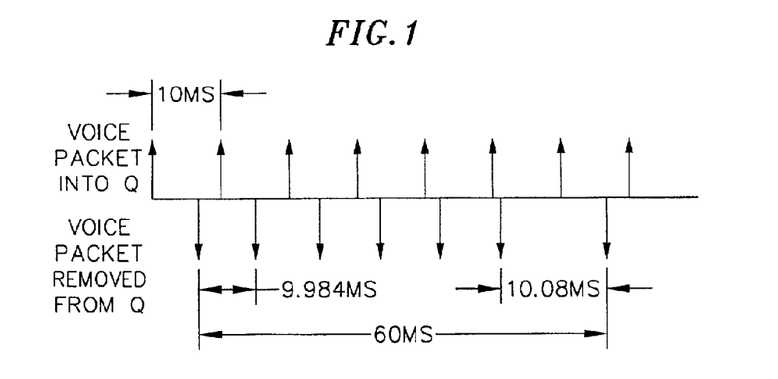
FIG. 1 is an exemplary diagram for voice sampling which shows the impact of varying the grant interval on the telephony packet queue, according to one embodiment of the present invention.

FIG. 1 is an exemplary diagram for voice sampling which shows the impact of varying the grant interval on the telephony packet queue. The drift in location of the grant, when the voice packet is removed from the queue, with respect to the ideal location is exaggerated in this figure. In reality, the fifth grant is only 80 us from the expected location. Both the jitter and drift are well within what is manageable in a telephony system, where sample rates are expected to be 125 us.

For example, in the 24 MHz sample rate case, with a 96 us OFDM burst size, there are 104 ⅙ OFDM bursts per 10 ms interval. To arrive at the 10 ms average frame interval, five out of every 6 frames would contain 104 minislots and one would contain 105 minislots. In other words, the average interval of six frames would still be 10 ms.

There can be a problem with oversubscribing voice slots on the shorter upstream frames. The issue is that if the longer frame (10.08 ms) is completely filled with voice transmit opportunities, then the shorter frames (9.984 ms) will have to drop the grant of at least one call. That call would experience a very long delay (one or more 10 ms frames) between some of its transmit opportunities. However, it is always possible for the WATS to reserve transmission intervals in each frame that allow contraction of the frame without loss of voice slots. Table 2 is a sample format for a 10 ms frame.

Figure 2:
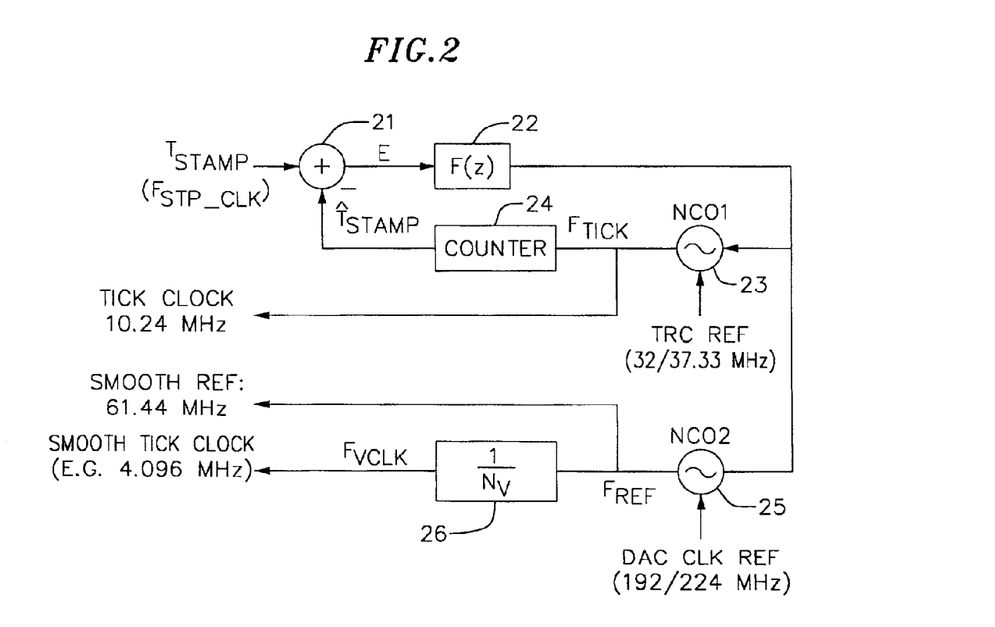
FIG. 2 is a simplified schematic of a timing recovery circuit (TRC) design.

As stated, the subscriber wireless modem must also derive an 8 KHz multiple clock for the audio sampling circuits. In the existing TRC circuits, a smooth 61.44 MHz is derived from the 10.24 MHz TRC clock in an NCO, as shown in FIG. 2. This Smooth Reference Clock is then divided by an integer in a programmable divider to produce a Smooth Tick Clock output for telephony sampling, in this case 4.096 MHz.

In one aspect, the present invention modifies the NCO to produce 61.44 MHz with all of the input TRC clock rates. The TRC clock has a frequency of $F_{TS}=Fs/4.5$ for all sample rates. At the Smooth Clock NCO, the denominator is programmable, as shown in the equation below. The value of x, for all Fs, is shown in Table 3.

$$7680 \cdot \left[ \frac{4.5 \cdot F_{TS}}{x} \right] = 61.44 \text{ Mhz}$$

This solution introduces benign delay jitter into telephony applications while preserving the DOCSIS timestamp messaging. Furthermore, this solution requires no change to the existing headend hardware. The subscriber smooth clock NCO is modified in order to recover the telephony sample clock from all of the various TRC clock rates. The headend scheduler is enhanced to accommodate the varying frame sizes required.

A potential difficulty arises in the generation of the "Smooth Ref" clock. In order to utilize existing circuitry, the "Smooth Ref" clock needs to have a frequency of exactly 61.44 MHz. This frequency can then be divided by 15 to yield the 4.096 MHz clock required by a VOIP module. In an embodiment of the present invention, a method is used to modify existing TRC circuitry to generate the desired 61.44 MHz "Smooth Ref" clock from time stamps based on a $F_s/4.5$ tick clock.

FIG. 2 is a simplified schematic of a timing recovery circuit (TRC) design. Wherein, $T_{stamp}$ is the time stamp value measured in tick clocks, $F_{stp\_clk}$ is update frequency of the time stamps, $F_{tick}$ is output frequency of the tick clock from NCO1 23, $F_{ref}$ is output frequency of the numerical controlled oscillator (NCO) NCO2 25, and $F_{vck}$ is voice module clock frequency(nominally, 4.096 MHz).

The headend communicates to the subscriber modem timing information through $T_{stamp}$, which is typically a 32-bit message that is sent to the subscriber modem. The contents of that message are stored in an incrementing counter 24, which is being incremented at 10.24 MHz. Occasionally, the headend sends to the subscriber the value of the $T_{stamp}$ message. At the subscriber end, the timing circuit of FIG. 2, looks at the values of the counts, and through a phase-locked loop (PLL), effectively regenerates the clock that was used to produce those counts at the headend.

However, this locally generated version of the 10.24 MHz clock has an error in it relative to the headend 10.24 MHz clock. To synchronize this local clock, the headend transmits messages through time stamps based on its own 10.24 MHz clock and the timing circuit of FIG. 2 uses the values in these time stamps to slow or speed its local 10.24 MHz clock to match the clock at the headend.

The local counter 24 is driven by the NCO1 23 to produce an estimate of the time stamp, $T^\wedge_{stamp}$. Phase detector/substracter 21 detects the phases of the time stamp $T_{stamp}$ and the estimated time stamp, $T^\wedge_{stamp}$ and takes the difference between the phases to generate an error value E. This error value E represents whether the local clock is running faster or slower than the clock at the headend. The error E is filtered in the loop filter 22 and is then fed back to control the NCO1 23 to generate the tick clock $F_{tick}$ and lock it to the headend 10.24 MHz clock. The output of filter 22 also drives NCO2 25 with the same error E. Filter 22 is a low pass filter and preferably has a narrow bandwidth for effectively slowing down the clock variations at the NCO1 23 and NCO2 25.

The output of the NCO2 25 produces $F_{ref}$, the smooth reference clock. This reference clock ($F_{ref}$) is also locked to the headend clock. The $F_{ref}$ clock is divided by divider 26 to generate $F_{vck}$ which is the voice module clock(nominally 4.096 MHz). In one embodiment, divider 26 is programmable. $F_{vck}$ which is also locked to the headend clock is then used to drive analog-to-digital and digital-to-analog converters for voice sampling. NCO1 23 and NCO2 25 are driven by two locally generated clocks, TRC $_{ref}$ and DAC $_{clk\_ref}$, respectively.

However, for telephony applications, there is a need to not only reproduce a locked 5.33 MHz clock, but also to produce a related 10.24 MHz clock on the subscriber side. Moreover, in order to accommodate the wireless OFDM minislot structure, a $F_s/4.5$ tick clock needs to be generated, while continuing to generate the 61.44 MHz, "Smooth Ref" and 4.096 MHz "Smooth Tick Clock." FIG. 3 is an exemplary simplified schematic that accomplishes these objectives.

Figure 3:
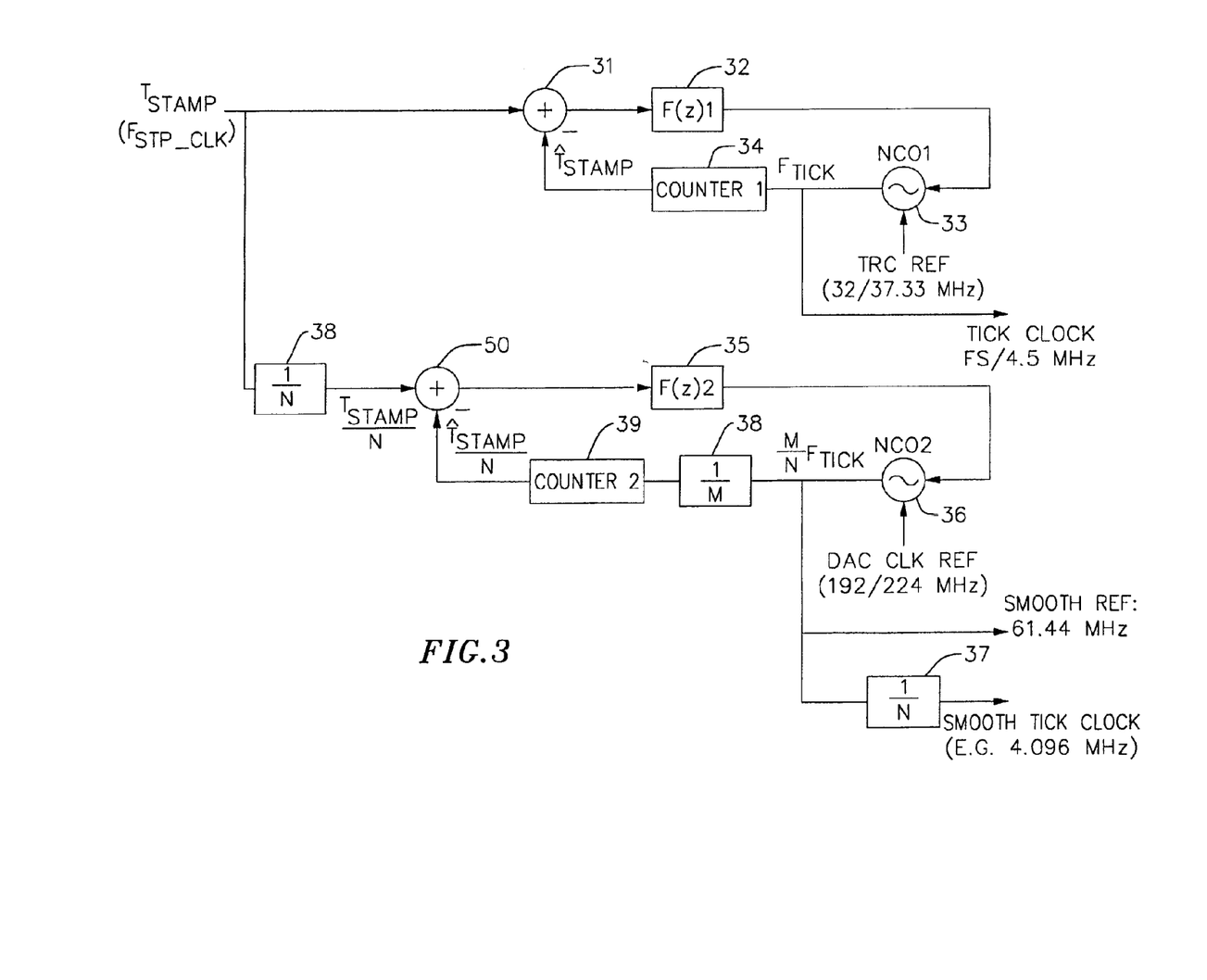
FIG. 3 is an exemplary simplified schematic of a TRC for telephony applications, according to one embodiment of the present invention.

In FIG. 3, the clock coming in from the headend is $F_s/4.5$, which is a 5.33 MHz clock for a sampling rate (FS) of 24 MHz. The output of NCO1 33, tick clock $F_{Tick}$ is again locked to the headend tick clock in a manner described above. The time stamp input is divided by N (divider/multiplier 51) before it is fed to the lower loop. Filter 35 filters the $T_{stamp}/N$ to drive the NCO2 36. Filter 35 is also a low pass filter and preferably has a narrow bandwidth for effectively slowing down the clock variations at the NCO2 36. The output of NCO2 36 is multiplied by M (divider/multiplier 38) before it drives counter 39. As a result, the output of the NCO2 is multiplied by a rational fraction M/N to produce the 61.44 MHz smooth reference clock which is locked to the headend $F_s/4.5$ clock. Table 1 demonstrates this rational relationship for different OFDM burst sizes and a 10 ms frame size.

Phase detector/substracter 50 detects the phases of the time stamp divided by N $T_{stamp}/N$ and the estimated time stamp, $T\hat{}_{stamp}/N$, and takes the difference between the phases to generate an error value E. This error value E represents whether the local clock is running faster or slower than the clock at the headend. The error E is filtered in the loop filter 35 and is then fed back to control the NCO2 36 to generate the tick clock $F_{tick}$ (multiplied by the ratio M/N) and lock it to the headend $F_s/4.5$ MHz clock. Divider/multiplier 37 further divides the locked smooth reference clock by $N_v$ to generate a locked 4.096 MHz smooth tick clock. NCO1 33 and NCO2 36 are driven by two locally generated clocks, TRC $_{ref}$ and DAC $_{clk\_ref}$, respectively.

The required divide factors for each OFDM clock mode are summarized below with common factors removed. The division of the time stamp by N can result in a rounding error due to finite precision. The following analysis quantifies the timing jitter that results from this error and determine required parameters to bound it appropriately. In one embodiment of the present invention, M and N are equal to 1, and 12 fractional bits are used to represent the time stamp divided by N result. The result of the divide by N stage should be rounded and not truncated to avoid bias errors. In this embodiment, the target ratio of the closed bandwidth of the smooth clock generation circuit to the time stamp update rate is 0.1 or less. Using the above parameters results in a negligible increase in timing jitter.

Figure 4:
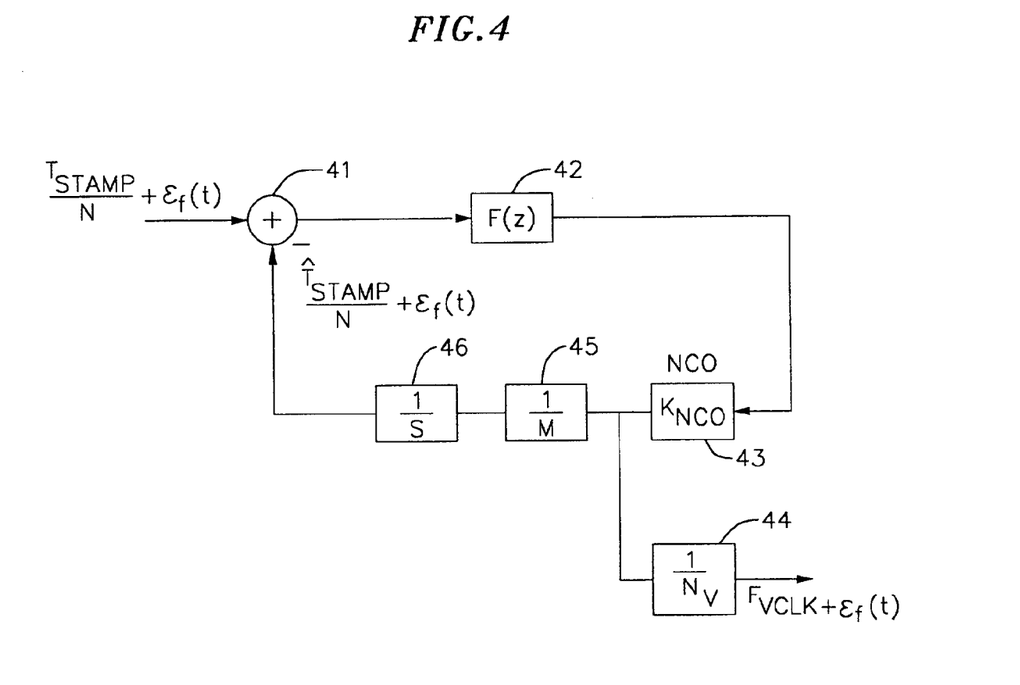
FIG. 4 is an equivalent analog model used as an analytical tool for performance analysis of the TRC circuit of FIG. 3.

FIG. 4 shows an equivalent analog model that the quantization error sees within the TRC circuit. This analog circuit is used as an analytical tool for performance analysis of the loop and determination of reasonable values for M and N. The analog circuit of FIG. 4 converts the time loop of FIG. 3 to an equivalent analog or continuous time representation.

Assuming that the number of fractional bits output from the divide by N operation on the time stamp is $B_F$, the time interval represented by the LSB is then:

$$\Delta = \frac{T_{tick}}{2^{B_F}} \quad [1]$$

$$= \frac{1}{F_{tick} 2^{B_F}}$$

If the divide by N is properly rounded, the Probability Distribution Function (pdf) of the quantization error is uniform from $-\frac{1}{2}$ to $\frac{1}{2}$. This process has a variance of $(2^{\wedge}12)$, and a power spectral density of:

$$S_{E_Q}(f) = \frac{\Delta^2}{12 F_{stp\_clk}} \quad -\frac{F_{stp\_clk}}{2} \leq f \leq \frac{F_{stp\_clk}}{2} \quad [2]$$

The closed loop transfer function is given by:

$$H_{cl}(s) = \frac{E_q(S)}{E_q(S)} = \frac{\frac{K_{NCO}}{Ms}F(s)}{1 + \frac{K_{NCO}}{Ms}F(s)} \quad [3]$$

The transfer function from the quantization error $\epsilon_q(t)$ to the frequency error $\epsilon_q(t)$ is $$H_f(S) = \frac{E_f(S)}{E_q(S)} = \frac{\frac{K_{NCO}}{N_v}F(S)}{1 + \frac{K_{NCO}}{Ms}F(S)} = \frac{Ms}{N_v}H_{cl}(S) \quad [4]$$

Error (or jitter) in time is the integral of the frequency error. Hence the transfer function from the input quantization error to the time jitter on the smoothed time clock reference output is $$H_o(S) = \frac{E_j(S)}{E_q(S)} = \frac{1}{S}H_f(S) = \frac{M}{N_v}H_{cl}(S) \quad [5]$$

The variance of the output error is $$E\{\varepsilon_j^2(t)\} = \int_f S_{e_q(f)} |H_o(f)|^2 df \quad [6]$$

$$= \frac{\Delta^2}{12 F_{stp\_clk}} \left(\frac{M}{N_v}\right)^2 2B_L$$

Where $B_L$ is defined as the loop bandwidth of the closed loop transfer function $H_{cl}(f)$. Substituting [1] into [6] and taking the square root leads to an expression for the standard deviation of the timing jitter on the output clock due to input quantization noise.

$$\sigma_{jit} = \frac{4.5 \, M}{N_v F_s 2^{B_F}} \sqrt{\frac{B_L}{6 F_{stp\_clk}}} \quad [7]$$

Coefficients in the loop filters are set to yield loop bandwidths similar to existing DOCSIS systems. The exact values of the "K0" and "K1" coefficients may be different. The target ratio of $B_L/F_{stp\_clk}$ is 0.1 or less. This is a reasonable ratio for even the smallest possible value of $F_{stp\_clk}$.

Figure 5:
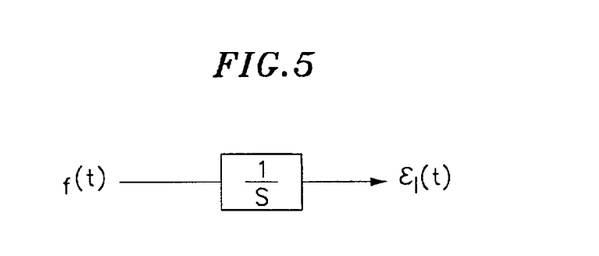
FIG. 5 is a simplified block diagram depicting output time jitter as a function of frequency jitter.

With a voice module output reference $F_{vclk}$=4.096 MHz, $N_v$ is equal to 15. Table 5 shows exemplary calculated value for ojit for required values of F, assuming that the number of fractional bits is equal to 12. FIG. 5 is a simplified block diagram depicting output time jitter as a function of frequency jitter.

The nominal specification on the clock output jitter is 5 nsec in DOCSIS. As shown above, the worst case output jitter caused by quantization error is 0.58. Since this value is small relative to 5 nsec, the quantization noise has little impact on overall performance, if the parameters in Table 5 are used.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

TABLE 1

OFDM BURST CHARACTERISTICS FOR A 10 MS FRAME

| | Fs (MHz) | | | | | | |
|---|---|---|---|---|---|---|---|
| | 24 | 28 | 32 | 36 | 48 | 56 | 60 |
| OFDM BURST SIZE (US) | 48 | 41.14286 | 36 | 32 | 24 | 20.57143 | 19.2 |
| | 96 | 82.2857 | 72 | 64 | 48 | 41.14286 | 38.4 |
| | 192 | 164.5714 | 144 | 128 | 96 | 82.28571 | 76.8 |
| OFDM BURSTS PER 10 MS | 201 1/3 | 243 1/18 | 277 7/9 | 312 1/2 | 416 2/3 | 186 1/9 | 520 5/6 |
| | 104 1/6 | 121 19/36 | 138 8/9 | 156 1/4 | 208 1/3 | 243 1/18 | 260 5/12 |
| | 52 1/12 | 60 55/72 | 69 4/9 | 78 1/8 | 104 1/6 | 121 19/36 | 130 5/24 |

TABLE 2

| BROADCAST REQUEST REGION (3 MINISLOTS) | UNSOLICITED GRANT REGION 80 MINISLOTS (CBR VOICE GRANTS) | ALLOCATED TRANSMIT REGION MAINTENANCE CALL CONTROL MESSAGING, AND IP DATA REGION (21 ORE 22 MINISLOTS) |
|---|---|---|
| 0.288 US | 7.68 MS | 2.016 MS (FOR 104 TOTAL MINISLOTS) 2.112 MS (FOR 105 TOTAL MINISLOTS) |

TABLE 3

NCO DENOMINATOR

| Fs (MHz) | X |
|---|---|
| 24 | 3000 |
| 28 | 3500 |
| 32 | 4000 |
| 36 | 4500 |
| 48 | 6000 |
| 56 | 7000 |
| 60 | 7500 |

TABLE 4

| Fs (MHz) | M | N |
|---|---|---|
| 24 | 288 | 25 |
| 28 | 1728 | 175 |
| 32 | 216 | 25 |
| 36 | 216 | 25 |
| 48 | 144 | 25 |
| 56 | 864 | 175 |
| 60 | 576 | 125 |

TABLE 5

CALCULATED VALUES OF $\sigma_{JIT}$

| Fs (MHz) | M | $N_V$ | Ns | $B_L/F_{STP\_CLK}$ | $\sigma_{JIT}$ (NSEC) |
|---|---|---|---|---|---|
| 24 | 288 | 15 | 12 | 0.1 | 0.11 |
| 28 | 1728 | 15 | 12 | 0.1 | 0.58 |
| 32 | 216 | 15 | 12 | 0.1 | 0.06 |
| 36 | 192 | 15 | 12 | 0.1 | 0.05 |
| 48 | 144 | 15 | 12 | 0.1 | 0.03 |
| 56 | 864 | 15 | 12 | 0.1 | 0.15 |
| 60 | 576 | 15 | 12 | 0.1 | 0.09 |

What is claimed is:

1. An electronic circuit for transmitting voice packet data, each having a frame size, over a wireless network with an upstream transmission mode and a downstream transmission mode comprising:

a first phase-lock loop (PLL) for locking a first clock to a time stamp signal, wherein the first clock synchronizes upstream data transmission over the wireless network; and a second PLL for locking a second clock to the time stamp signal, wherein the second clock is used for sampling voice data for downstream voice data transmission over the wireless network and for varying the frame size of each voice packet, wherein a predetermined average value of the frame sizes is maintained.

2. The circuit of claim 1, wherein the first PLL comprises:

a low pass filter;

a numerically controlled oscillator (NCO) coupled to the output of the low pass filer;

a counter loaded with a time stamp message and driven by the NCO for generating an estimated time stamp signal; and a phase detector for detecting phases of the time stamp signal and the estimated time stamp signal and taking a difference of the phases for generating an error value.

3. The circuit of claim 1, wherein the second PLL comprises:

a second low pass filter;

a second numerically controlled oscillator (NCO) coupled to the output of the low pass filer, wherein the low pass filter slows the clock variation at the input of the NCO;

a first divider/multiplier for dividing a time stamp message by N, where N is an integer;

a second divider/multiplier for multiplying the output of the NCO by M, where M is an integer;

a second counter loaded with the time stamp message divided by N and driven by the second divider/multiplier for generating an estimated adjusted time stamp signal; and a second phase detector for detecting phases of the time stamp divided by N signal and the estimated adjusted time stamp signal for generating an error value.

4. The circuit of claim 3, further comprising a third divider/multiplier for dividing the output of the second NCO by N for generating a third clock locked to the time stamp signal.

5. The circuit of claim 3, wherein the ratio of M/N is a rational fraction.

6. The circuit of claim 1, wherein the time stamp signal is received from a headend and is defined by $F_s/4.5$ MHz where $F_s$ is a sampling frequency for transmitting data.

7. The circuit of claim 6, wherein the sampling frequency for transmitting data is 24 MHz.

8. The circuit of claim 3, wherein input of the first divider/multiplier is 32 bits wide and output of the first divider/multiplier is 48 bits wide.

9. The circuit of claim 1, wherein the time stamp signal is received from a headend according to Data Over Cable Service Interface Specification (DOCSIS).

10. The circuit of claim 1, further comprising a phase detector for detecting phases of the time stamp signal and an estimated time stamp signal and taking a difference of the phases for generating an error value.

11. A method for transmitting voice packet data with a predetermined average data frame duration, over a wireless network with an upstream transmission mode and a downstream transmission mode, the method comprising the steps of:

receiving a time stamp signal via the wireless network;

locking a first clock to the received time stamp signal, wherein the first clock is used for synchronizing upstream data transmission over the wireless network; and locking a second clock to the received time stamp signal, wherein the second clock is used for sampling voice data for downstream voice data transmission over the wireless network; and varying the data frame duration of each voice packet while maintaining the predetermined average data frame duration.

12. The method of claim 11, wherein the locking a first clock comprises the steps of:

loading a counter with a time stamp message received via the wireless network;

driving the counter with a numerically controlled oscillator;

generating an error value by taking a difference between the received time stamp signal and output of the counter, wherein the error value represents whether the first clock is running faster or slower than the time stamp signal received via the wireless network.

13. The method of claim 11, wherein the locking a second clock comprises the steps of:

dividing a time stamp message received via the wireless network by a value N for generating an adjusted time stamp message, N wherein is an integer;

loading a second counter with the adjusted time stamp message for generated an estimated adjusted time stamp message;

driving a second numerically controlled oscillator by the received time stamp signal;

multiplying the output of the numerically controlled oscillator by a number M for generating a locked tick clock, where M is an integer;

driving the counter with the locked tick clock;

detecting phases of the adjusted time stamp message and the estimated adjusted time stamp message; and generating an error value by taking a difference between the phases of the adjusted time stamp message and the estimated adjusted time stamp message.

14. The method of claim 13, further comprising the step of dividing the output of the second NCO by N for generating a third clock locked to the time stamp signal.

15. The method of claim 13, wherein the ratio of M/N is a rational fraction.

16. The method of claim 11, wherein the time stamp signal is received from a headend and is defined by $F_s/4.5$ MHz where $F_s$ is a sampling frequency for transmitting data.

17. The method of claim 16, wherein the sampling frequency for transmitting data is 24 MHz.

18. The method of claim 11, wherein the time stamp signal is received from a headend according to Data Over Cable Service Inteface Specification (DOCSIS).

19. The method of claim 11, further comprising the step of detecting phases of the time stamp signal and an estimated time stamp signal and taking a difference of the phases for generating an error value.

20. A system for transmitting isochronous voice data with over a fixed wireless network with an upstream transmission mode and a downstream transmission mode comprising:

means for scheduling a number of transmission data frames with a predetermined average data frame duration;

means for receiving a time stamp signal;

means for locking a first clock to the received time stamp signal, wherein the first clock is used for synchronizing upstream data transmission over the wireless network;

means for locking a second clock to the received time stamp signal, wherein the second clock is used for sampling voice data; and means for varying the data frame duration of each voice packet while maintaining the predetermined average data frame duration.

21. The system of claim 20, wherein the means for locking a first clock comprises:

means for generating an estimated time stamp signal; and means for taking a difference of the time stamp signal and the estimated time stamp signal for generating an error value.

22. The system of claim 20, wherein the means for locking a second clock comprises:

means for dividing a time stamp message by N for generating an adjusted time stamp, where N is an integer;

means for generating an estimated adjusted time stamp signal;

and means for detecting phases of the adjusted time stamp message and the estimated adjusted time stamp message;

and means for generating an error value by taking a difference between the phases of the adjusted time stamp message and the estimated adjusted time stamp message.

23. The system of claim 22, further comprising means for generating a third clock locked to the time stamp signal.

24. The system of claim 20, wherein the time stamp signal is received from a headend and is defined by $F_s/4.5$ MHz where $F_s$ is a sampling frequency for transmitting data.

25. The system of claim 24, wherein the sampling frequency for transmitting data is 24 MHz.

26. The system of claim 20, wherein the time stamp signal is received from a headend according to Data Over Cable Service Interface Specification (DOCSIS).

27. A method for transmitting isochronous voice data over a fixed wireless network with an upstream transmission mode and a downstream transmission mode, the method comprising the steps of:

scheduling a number of transmission data frames with a predetermined average data frame duration;

receiving a time stamp signal;

locking a first clock to the received time stamp signal, wherein the first clock is used for synchronizing upstream data transmission over the wireless network;

locking a second clock to the received time stamp signal, wherein the second clock is used for sampling voice data; and     varying the data frame duration of each voice packet while maintaining the predetermined average data frame duration while maintaining the predetermined average data frame duration.

28. The method of claim 27, wherein the locking a first clock comprises the steps of:

loading a counter with a time stamp message received via the wireless network;

driving the counter with a numerically controlled oscillator;

generating an error value by taking a difference between the received time stamp signal and output of the counter, wherein the error value represents whether the first clock is running faster or slower than the time stamp signal received via the wireless network.

29. The method of claim 27, wherein the locking a second clock comprises the steps of:

dividing a time stamp message received via the wireless network by a value N for generating an adjusted time stamp message, where N is an integer;

loading a second counter with the adjusted time stamp message for generated an estimated adjusted time stamp message;

driving a second numerically controlled oscillator by the received time stamp signal;

multiplying the output of the numerically controlled oscillator by a number M for generating a locked tick clock,     driving the counter with the locked tick clock;

detecting phases of the adjusted time stamp message and the estimated adjusted time stamp message;

and generating an error value by taking a difference between the phases of the adjusted time stamp message and the estimated adjusted time stamp message.

30. The method of claim 29, further comprising the step of dividing the output of the second NCO by N for generating a third clock locked to the time stamp signal.

31. The method of claim 29, wherein the ratio of M/N is a rational fraction.

32. The method of claim 27, wherein the time stamp signal is received from a headend and is defined by $F_s/4.5$ MHz where $F_s$ is a sampling frequency for transmitting data.

33. The method of claim 32, wherein the sampling frequency for transmitting data is 24 MHz.

34. The method of claim 27, wherein the time stamp signal is received from a headend according to DOCSIS specification.

35. The method of claim 27, further comprising the step of detecting phases of the time stamp signal and an estimated time stamp signal and taking a difference of the phases for generating an error value.

\* \* \* \* \*

UNITED STATES PATENT AND TRADEMARK OFFICE
CERTIFICATE OF CORRECTION

PATENT NO. : 6,944,249 B2
APPLICATION NO. : 09/850652
DATED : September 13, 2005
INVENTOR(S) : Hartman et al.

It is certified that error appears in the above-identified patent and that said Letters Patent is hereby corrected as shown below:

In the Claims

Column 11, line 54, Claim 13       Delete "N wherein",
Insert --where N--

Column 12, line 16, Claim 18       Delete "Inteface",
Insert --Interface--

Column 12, line 22, Claim 20       Delete "with"

Column 14, line 7, Claim 29       After "tick clock,",
Insert --where M is an integer;--

Signed and Sealed this

Second Day of October, 2007

JON W. DUDAS
*Director of the United States Patent and Trademark Office*